(12) United States Patent
Pignataro et al.

(10) Patent No.: US 8,640,036 B2
(45) Date of Patent: Jan. 28, 2014

(54) MESSAGING AND PRESENCE PROTOCOL AS A CONFIGURATION AND MANAGEMENT BUS FOR EMBEDDED DEVICES

(75) Inventors: Carlos Maria Pignataro, Raleigh, NC (US); Joseph Michael Clarke, Cary, NC (US); Rajesh Kumar, Palo Alto, CA (US); Mohammed Baseer Khan, Santa Clara, CA (US); Mohamed Saad Mostafa, Emerald Hills, CA (US); Sanjeev S. Ukhalkar, Fremont, CA (US); Michel Khouderchah, Cupertino, CA (US); Mark Allan Son-Bell, Los Altos, CA (US)

(73) Assignee: Cisco Techology, Inc., San Jose, CA (US)

( * ) Notice: Subject to any disclaimer, the term of this patent is extended or adjusted under 35 U.S.C. 154(b) by 491 days.

(21) Appl. No.: 12/755,635

(22) Filed: Apr. 7, 2010

(65) Prior Publication Data
US 2011/0252337 A1     Oct. 13, 2011

(51) Int. Cl.
*G06F 15/16*     (2006.01)
*G06F 3/01*     (2006.01)

(52) U.S. Cl.
USPC .......................................... 715/758; 715/748

(58) Field of Classification Search
USPC ................................................ 715/748, 758
See application file for complete search history.

(56) References Cited

U.S. PATENT DOCUMENTS

| | | | |
|---|---|---|---|
| 8,060,630 B1* | 11/2011 | Jancaitis et al. | 709/229 |
| 2004/0068567 A1* | 4/2004 | Moran et al. | 709/227 |
| 2007/0219881 A1 | 9/2007 | Peterson et al. | |
| 2010/0205100 A1* | 8/2010 | Hurley et al. | 705/80 |

OTHER PUBLICATIONS

J. Jachner et al., Rich Presence: A New User Communications Experience, Technology White Paper, Alcatel Telecommunications Review, 1st Quarter 2005.

* cited by examiner

*Primary Examiner* — Andrea Leggett
(74) *Attorney, Agent, or Firm* — Edell, Shapiro & Finnan, LLC

(57) ABSTRACT

Techniques are provided herein for establishing at a network management server a presence on a network. A presence associated with one or more managed devices on the network is detected. An instant messaging (IM) session is established with the one or more managed devices. The IM session forms a virtual chat room for performing a management function on the one or more managed devices, and IM messages are sent that are configured to perform the management function on the one or more managed devices. Techniques are also provided herein for establishing on a network an enriched presence by a network management server that is configured to perform a management function via a presence function of a messaging and presence protocol.

29 Claims, 10 Drawing Sheets

MESSAGING AND PRESENCE PROTOCOL AS A CONFIGURATION AND MANAGEMENT BUS FOR EMBEDDED DEVICES

TECHNICAL FIELD

The present disclosure relates to network management, and more specifically to managing network devices by leveraging the instant messaging and presence features of a messaging and presence protocol.

BACKGROUND

Instant messaging (IM) has grown from simple messaging in the 1960's, bulletin board systems of the 1980's, and messaging applications of the 1990's, into the field of unified communications, which provides real-time communications services such as unified messaging (integrated email, voicemail, fax, instant messaging, and presence information), telephony, and video conferencing. Enabling many of these IM features are a number of messaging and presence protocols, such as Instant Messaging and Presence Service (IMPS), Extensible Messaging and Presence Protocol (XMPP), and Session Initiation Protocol (SIP) with its extension SIP for Instant Messaging and Presence Leveraging Extensions (SIMPLE), to name a few.

These protocols allow the establishment of an IM session that may include IM, file transfer, voice, and video. Underlying these protocols is the concept of "presence" which indicates a user's willingness, capacity, or ability to communicate. Before one can initiate an IM session with another, one must ascertain the status of the other, e.g., "off-line", "busy", or "do no disturb". Presence information is periodically shared across the network, while IM is event driven, i.e., nothing happens until a user takes action. Both IM and presence can be leveraged to perform a variety of tasks.

DESCRIPTION OF EXAMPLE EMBODIMENTS

Overview

Techniques are provided herein for establishing at a network management server a presence on a network. A presence associated with one or more managed devices on the network is detected. An IM session is established with the one or more managed devices. The IM session forms a virtual chat room for performing a management function on the one or more managed devices, and IM messages are sent that are configured to perform the management function on the one or more managed devices.

Techniques are also provided herein for establishing on a network an enriched presence by a network management server that is configured to perform a management function via a presence function of a messaging and presence protocol. The enriched presence allows the exchange of operational parameters of enriched presence capable endpoints and the operational parameters of any sub-entities associated with the enriched presence capable endpoints. An enriched presence associated with a managed device is detected on the network. In response to detecting the enriched presence associated with the managed device, an enriched presence message is sent to the managed device that is configured to allow the managed device to establish presence with the network management server. A registration message is received from the managed device that is configured to register the device and any sub-entities associated with the managed device. The managed device is managed based on a mutually correlated presence between the network management server and the managed device.

Example Embodiments

Figure 1:
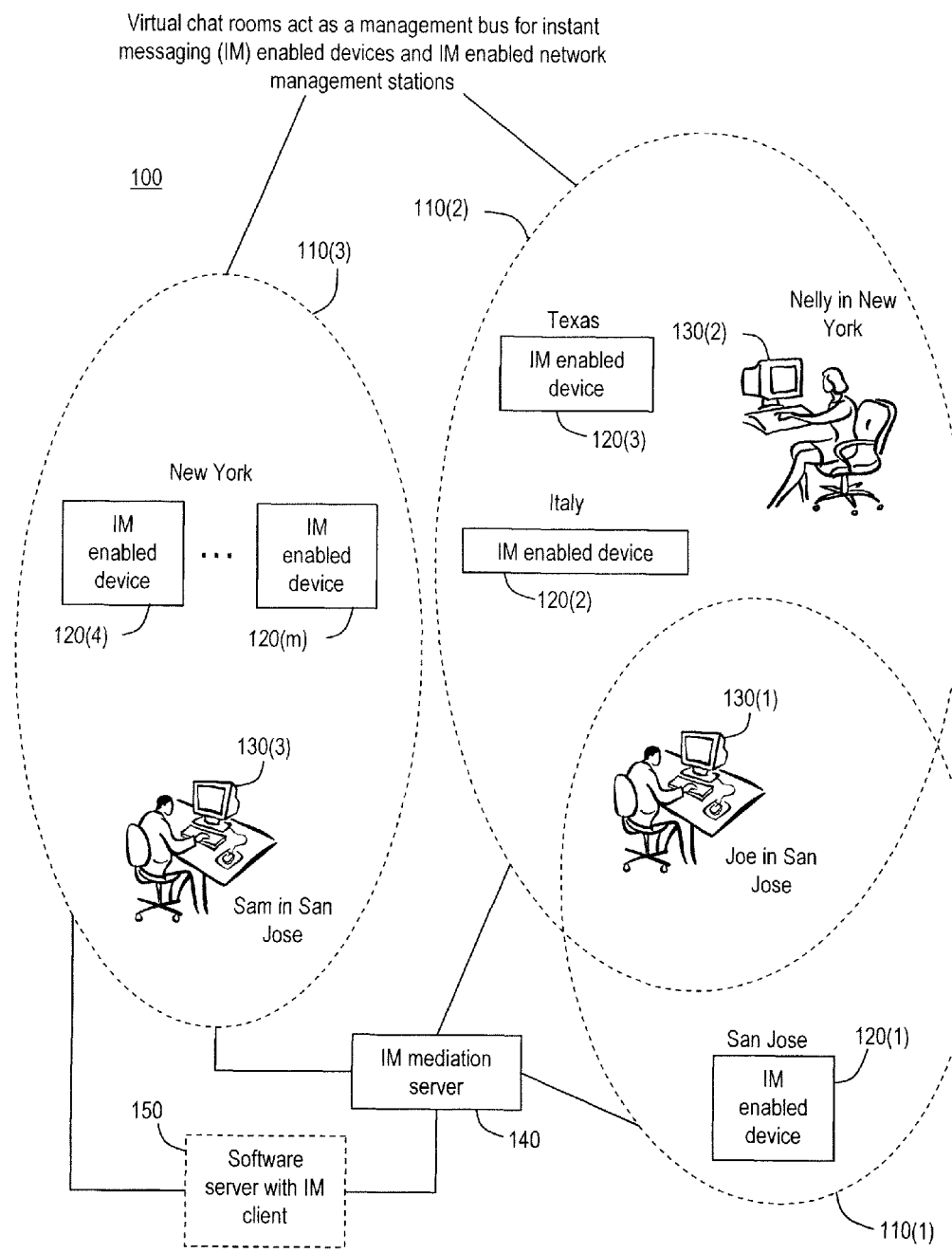
FIG. 1 is an example of a diagram for a network of virtual chat rooms with one or more IM enabled endpoints that are managed by one or more IM enabled network management servers (NMSs).

Referring first to FIG. 1, a diagram for a network 100 of virtual chat rooms 110(1)-110(3) is shown. Each of the virtual chat rooms has one or more IM enabled endpoints or devices 120(1)-120 that are managed by one or more IM enabled network management systems, stations, or servers (NMSs) 130(1)-130(3). The network 100 has an IM mediation server 140 and an optional software server 150 as shown by a dashed box. The IM enabled endpoints 120(1)-120 may be devices that have embedded system functions, e.g., network router, switches, or cellular base station that are usually managed from a remote location, i.e., their operating parameters may be changed or configured in response to network conditions, or new software or firmware images may be upgraded or downgraded remotely. Alternatively, IM enabled endpoints 120(1)-120 may be any device capable of establishing presence on a network and that has an IM capability, e.g., IM enabled endpoints 120(1)-120 could be mobile phones or personal computers.

Each virtual chat room 110 has at least one IM enabled network management server 130 for performing management functions for the IM enabled endpoints 120(1)-120(m). In virtual chat room 110(1) Joe in San Jose is managing a single IM enabled endpoint 120(1) in San Jose using IM enabled NMS 130(1) via IM, with IM mediation server 140 mediating the messaging and presence for virtual chat room 110(1). Thus, virtual chat room 110(1) forms a "management bus" in which one operator Joe is managing one device, i.e., IM enabled endpoint 120(1), in a one-to-one correspondence.

The operations of the management bus from the perspective of the network management station will be described generally in connection with FIGS. 1, 2, and 3, and described more specifically in connection with FIG. 5. The operations of the management bus from the perspective of the IM enabled endpoint will be described generally in connection with FIGS. 1, 2, and 4, and also described more specifically in connection with FIG. 5. Network device management using the enriched presence features of a messaging and presence protocol will be described in connection with FIGS. 6-10.

In virtual chat room 110(2), Joe in San Jose and Nelly in New York are collaboratively managing IM enabled endpoint 120(2) in Texas, and IM enabled endpoint 120(3) in Italy. In one example, Joe is an expert in the operation of IM enabled endpoints 120(2) and 120(3) and Nelly is a novice. By virtue of the virtual chat room 120(2) Joe can train Nelly in the operation and configuration of IM enabled endpoints 120(2) and 120(3) because Nelly can both see what Joe is doing and hear what Joe is saying. In another example, Nelly sends a single IM with an embedded command to both IM enabled endpoints 120(2) and 120(3) simultaneously commanding both devices to perform a function substantially at the same time, e.g., Nelly may have commanded both IM enabled endpoints 120(2) and 120(3) to reboot using the single command.

Absent the techniques described herein, devices with embedded systems would normally be managed individually using Simple Network Management Protocol (SNMP) or through a command line interface (CLI), e.g., through a Telnet or Secure Shell (SSH). However, by virtue of the virtual chat room 110(2) a management bus is formed in which either operator, Joe or Nelly, may managing two IM enabled endpoints 120(1) and 120(2) in a two-to-two correspondence. This example is extensible to any number of users N and any number of devices or endpoints M to form an N:M correspondence. Any number of the M devices may be grouped to receive a single command or a series of commands.

In virtual chat room 110(3) Sam in San Jose is managing a cluster of IM enabled endpoints 120(4)-102 in New York. In one example, Sam needs to upgrade software on IM enabled endpoints 120(4)-102. Sam sends a single IM with an embedded command to IM enabled endpoints 120(4)-120. In this example, the software may be sent to the devices from, e.g., software server 150, using a file transfer capability of the messaging and presence protocol in use. In another example, IM enabled endpoints 120(4)-120 have a File Transfer Protocol (FTP) client and software server 150 has an FTP server, and the IM command sent by Sam tells the IM enabled endpoints 120(4)-120 to retrieve their new software image from the FTP server. The IM command may optionally contain login parameters for logging in to the FTP server. Communications security may be provided through an inherent mechanism of the messaging and presence protocol in use. Virtual chat room 110(3) forms a management bus in which Sam manages many IM enabled endpoints 120(4)-120 in a one-to-many scheme.

It should be noted that the IM enabled endpoints or devices or the enriched presence capable endpoints referred to herein may establish an IM session or enriched presence without human intervention and may communicate amongst themselves using IM or enriched presence. For example, traditional presence conveys endpoint state, e.g., the endpoint is "up" and running, while enriched presence may convey endpoint attributes such as endpoint configuration, software load, inventory, neighboring devices/sub-entities, alarm conditions, etc. In one example, devices may communicate status to each other. The status may indicate a system failure or traffic congestion at a network node. On the basis of the status information the network may perform a self-healing function or reroute network traffic automatically and without human intervention. Network management is also informed, whereby repairs can be made or new equipment installed to reduce network congestion.

Many of the examples are described herein using generic terms, e.g., using an "IM protocol" or via a protocol that enables "presence" or "enriched presence", while some examples may be described according to a specific protocol, e.g., XMPP. These examples are not meant to be limited to any particular protocol. Any protocol that provides IM features may be used with the IM techniques described herein and any protocol that provides presence features may be used with the presence enabled techniques described herein. Examples protocols include open protocols, such as IMPS, XMPP, or SIP/SIMPLE as mentioned above, or proprietary protocols such as Skype or IBM Lotus Sametime, to name a few.

Figure 2:
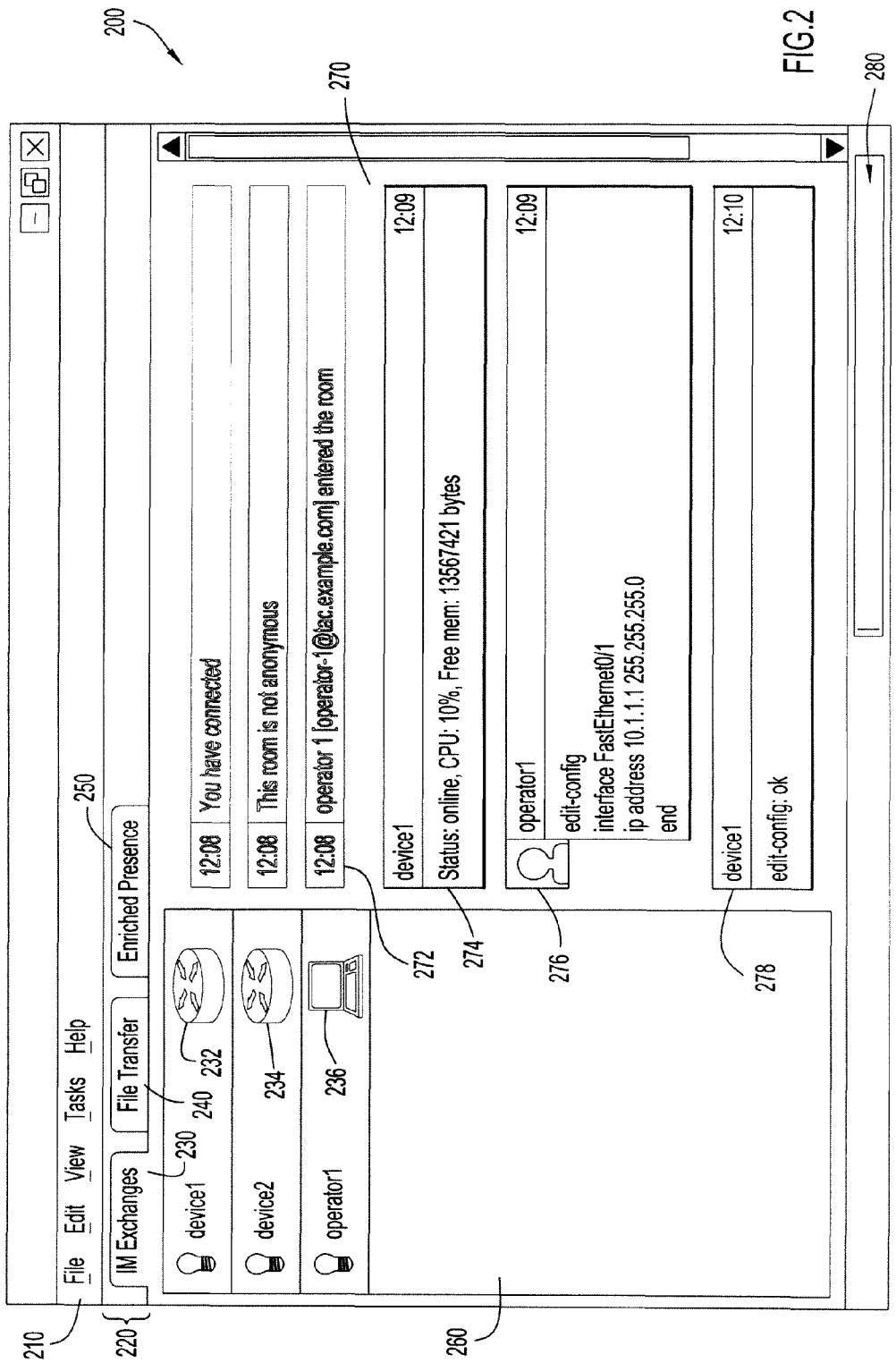
FIG. 2 is an example user interface screen for an IM enabled NMS.

Referring to FIG. 2, a user interface screen, e.g., a graphical user interface (GUI) 200 is shown for an IM enabled NMS. The GUI 200 may also be referred to as a Messaging User Interface (MUI) or a Messaging and Presence User Interface (MPUI). The GUI 200 has a menu 210, a tabbed display area 220 with Instant Messaging tab 230 for exchanging instant messages, File Transfer tab 240 for performing a file transfer function as described above, and Enriched Presence tab 250 which will be described in connection with FIG. 7. The user interface screen is used by operators, e.g., Joe, Nelly, and Sam, for managing devices. Thus, the user interface screen may be part of an application that is "launched" by an operator. It could optionally be launched when a first operator sends a second operator and invitation to join a chat room. The user interface screen may also be launched on a managed device, e.g., for an end user to watch a maintenance or repair operation.

In this example the "Instant Messaging" tab 230 is selected. Within the IM tab 230 are display areas 260 and 270, and a text entry area 280. In display area 260, members of the chat room or a "buddy list" are displayed. In this example, the buddy list includes entities such as device1 and device2, and individuals, such as operator1. Although not shown in FIG. 2, a "buddy" in the buddy list may also have "sub-buddies" or sub-entities, e.g., device1 may have sub-entities, such as a processor, network interface, or a neighboring entity. Also displayed in display area 260 are certain attributes of the members. For example, attributes may include member chat room status. Examples of chat room status may be Online, Offline, Busy, Communications failure, System Down, and the like. Also displayed in display area 260 are example device types. In this example, device1 and device2 are network devices as indicated by router symbols or icons 232 and 234, while operator1 has a terminal symbol 236. For greater details about members, a "mouse over" or "mouse hover" feature may be implemented. A momentary pause over a member device icon will cause a pop-up window to give greater details for the member, e.g., the member's location, Internet Protocol (IP) address, or latitude and longitude, status, and the like. Member information may be obtained from a message sent from, e.g., device1. The message could be in the form of an actual Instant Message or in the form of an enriched presence heartbeat that is sent periodically.

In display area 270, chat room activity is displayed. In this example, at 272, operator1 has joined or entered the chat room at 12:08 in the afternoon. At 274, operator1 has started a chat with device 1. In response, device1 has sent a status message indicating central processing unit usage at 10% and free memory of 13,567,421 bytes. At 276, operator1 has entered a series of commands via the text entry area 280 to configure device1. The commands are entered in a similar fashion as CLI commands are entered. In this example, operator1 has sent an "edit-config" command to place device1 in the edit configuration mode. Operator1 next configures device1's interface to be fast Ethernet, with an IP address to 10.1.1.1 and a mask of 255.255.255.0. Operator1 takes device1 out of the edit configuration mode by sending and "end" command. At 278, device1 responds with an edit configuration "ok" message indicating that device1 accepted the configuration changes from operator1.

There are several advantages when using this form of GUI in the context of an IM protocol like XMPP. First, devices can "message" to each other either in a 1:1 fashion for private messaging or 1: M fashion in which case the users "see" and log this communication. Multiple users, e.g., a support expert engineer or a customer representative, can join the "troubleshooting chat room" and see each other, natively and naturally. The GUI allows for a logical merge point for all sessions in a "System" or "Solution", in a way that when information is needed from multiple devices, it can be gathered and compared on the same "space". The GUI allows devices, e.g., a root port, a processor in a linecard, a phone, a set-top-box, to have "presence" and show "how they feel" (e.g., a phone being busy, a processor being idle, a set-top-box being "I am upgrading" or "in a meeting"). It allows for a central place to perform tasks that need to poll a sequence of devices, embedded or not, from a single place. For example, the GUI allows one to perform a type of "traceroute" by asking sequentially different devices by means of messaging. Lastly, the GUI provides a way of privately operating on one device at a time as XMPP provides a way of sending unicast messages to one party while still being subscribed to a multi-party chat room.

In other examples, XMPP is extensible such that the managed device could set an attribute (or a tag) in the XMPP response packet to indicate that a command failed, and how. This offloads intelligence from the NMS, reduces false positives, and adds robustness to device management. Given the Extensible Markup Language (XML) nature of XMPP, it would also be possible to incorporate the Network Configuration Protocol (NETCONF) standard to leverage its existing network management schema and error control features. The NETCONF standard includes a definition for passing error information between the agent (device) and the management station. Because of the high-level nature of the NETCONF specification, it can be implemented over a variety of protocols. Currently, NETCONF has been implemented over, e.g., Secure Shell Version 2 and the Block Extensible Exchange Protocol. NETCONF may also be implemented over XMPP.

Figure 3:
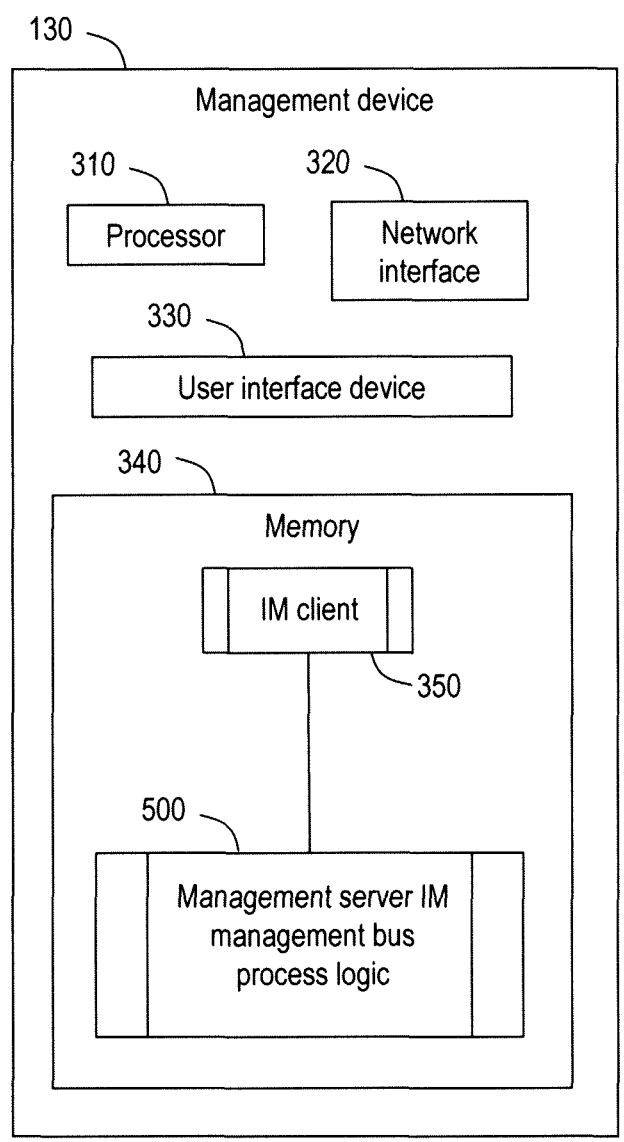
FIG. 3 is an example block diagram of an IM enabled NMS.

Turning now to FIG. 3, an example block diagram of a management device, e.g., IM enabled NMS 130, is shown. The NMS 130 comprises a data processing device 310, a network interface unit 320, a user interface device 330, and a memory 340. Resident in the memory 340 is an IM client 350 and software configured to execute management server IM management bus process logic 500. Briefly, process logic 500 configures NMS 130 to manage devices on network 100 via IM client 350 as generally described above. The details of the process logic 500 will be described in connection with FIG. 5.

The data processing device 310 may be a microprocessor, a microcontroller, systems on a chip (SOCs), or other fixed or programmable logic. The memory 340 may be any form of random access memory (RAM) or other data storage block that stores data used for the techniques described herein. The memory 340 may be separate or part of the processor 310. Instructions for performing the process logic 500 may be stored in the memory 340 for execution by the processor 310 such that when executed by the processor, causes the processor to perform the functions describe herein in connection with FIG. 3. The network interface unit 320 enables communication over network 100. The user interface device 330 comprises a display and keyboard for viewing and entering data, and may optionally comprise other input devices such a computer mouse and a camera for the chat room. It should be understood that any of the devices in system 100 may be configured with a similar hardware or software configuration as NMS 130.

The functions of the processor 310 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 340 stores data used for the computations or functions described herein (and/or to store software or processor instructions that are executed to carry out the computations or functions described herein). Thus, functions of the process logic 500 may be implemented with fixed logic or programmable logic (e.g., software or computer instructions executed by a processor or field programmable gate array (FPGA)).

Figure 4:
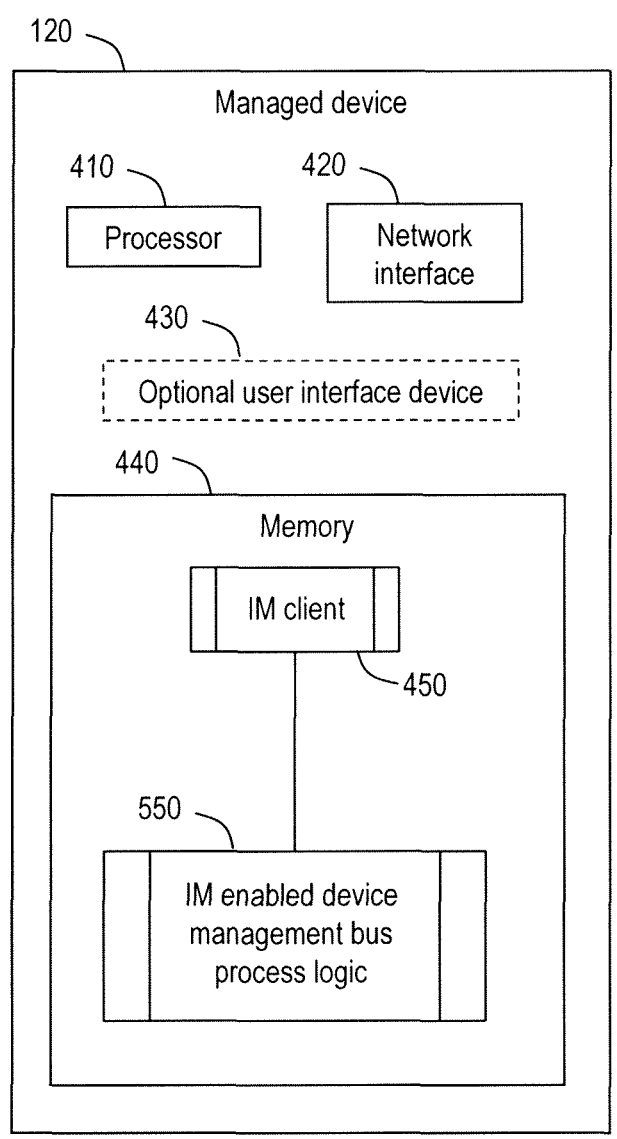
FIG. 4 is an example block diagram of an IM enabled device.

Referring to FIG. 4, an example block diagram of a managed device, e.g., IM enabled endpoint 120, is shown. The IM enabled endpoint 120 comprises a data processing device 410, a network interface unit 420, an optional user interface device 430, and a memory 440. Resident in the memory 440 is an IM client 450 and software configured to execute managed device IM management bus process logic 550. Briefly, process logic 550 configures IM enabled endpoint 120 to receive instant messages over network 100 comprising management commands, and respond accordingly, as generally described above. The details of the process logic 550 will be described in connection with FIG. 5.

The functions of the various components for IM enabled endpoint 120 operate essentially the same way as the components of NMS 130, as described in connection with FIG. 3. The optional user interface device 430 is optional, as shown by the dashed box, because it may not be required for a remote or embedded system. The IM enabled endpoint 120 may instead have a serial port for connecting to a dumb terminal, or provide a terminal connection or web interface via the network interface unit 420.

Figure 5:
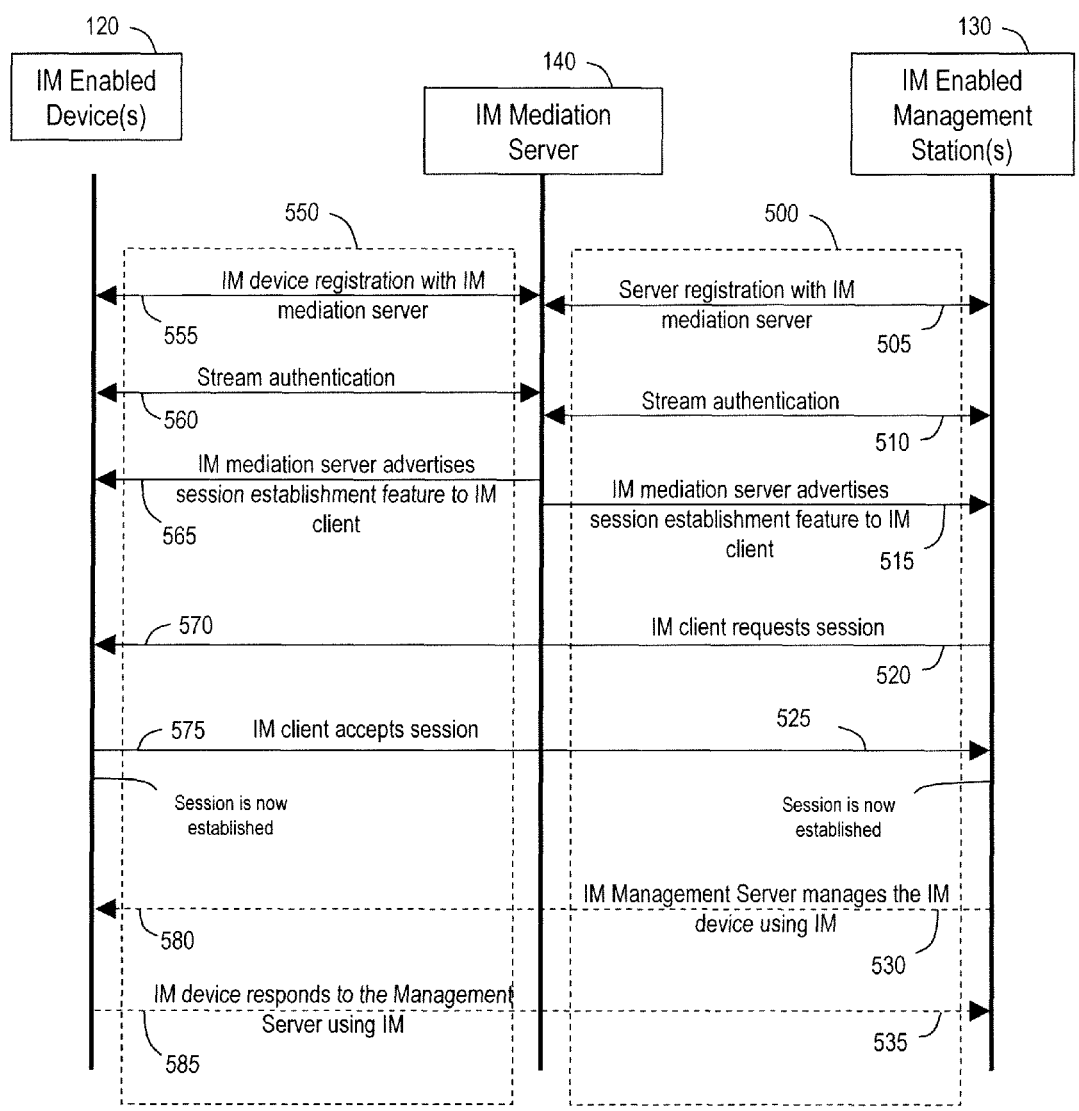
FIG. 5 is an example of a ladder diagram for a method to manage one or more IM enabled endpoints in a virtual chat room.

Turning now to FIG. 5, the management server IM management bus process logic 500 and the managed device IM management bus process logic 550 will now be described in conjunction with each other. In FIG. 5 devices from FIG. 1, e.g., one or more IM enabled NMS(s) 130 and one or more IM enabled endpoint(s) 120 form a virtual chat room management bus mediated by IM mediation server 140. The steps associated with management process logic 500 are framed with a dashed line and comprise steps 505-535, while steps associated with managed process logic 550 are also framed with a dashed line and comprise steps 555-585.

Starting with management process logic 500, at 505, IM enabled NMS 130 registers with the IM mediation server 140. At 510, IM enabled NMS 130 performs a stream authentication. The stream authentication provides a means of ensuring communications security. The streams may be verified by contacting a certificate authority, e.g., for an X.509 certificate. At this point, IM enabled NMS 130 has established a presence on the network. After stream authentication, at 515, IM enabled NMS 130 receives an advertisement from the IM mediation server 140 indicating that sessions may now be established between devices. On the IM enabled endpoint side, managed process logic 550 performs similar steps at 555, 560, and 565 for IM enabled endpoint 120.

At 520, IM enabled NMS 130 requests a session with IM enabled endpoint 120. In one example, an XMPP Session Initiate message may be sent. At 570, the session request is received by the IM enabled endpoint 120. At 575, the IM enabled endpoint 120 accepts the session and sends a session accept message, e.g., using an XMPP Session Accept message. Sessions may also be rejected for a variety of reason by any party to the chat room. At 525, IM enabled NMS 130 receives the session accept message, thereby establishing the session/virtual chat room between IM enabled NMS 130 and IM enabled endpoint 120.

Once the virtual chat room is established, at 530, IM enabled NMS 130 can send instant messages comprising various commands to IM enabled endpoint 120 in order to perform various management functions. At 585, the IM enabled endpoint 120 responds to commands sent by IM enabled NMS 130 using instant messages. Some IM enabled NMS 130 commands may not require a response. Commands sent from IM enabled NMS 130 may be multicast to a plurality of devices or unicast to a single device, and used for device identification and device configuration.

Figure 6:
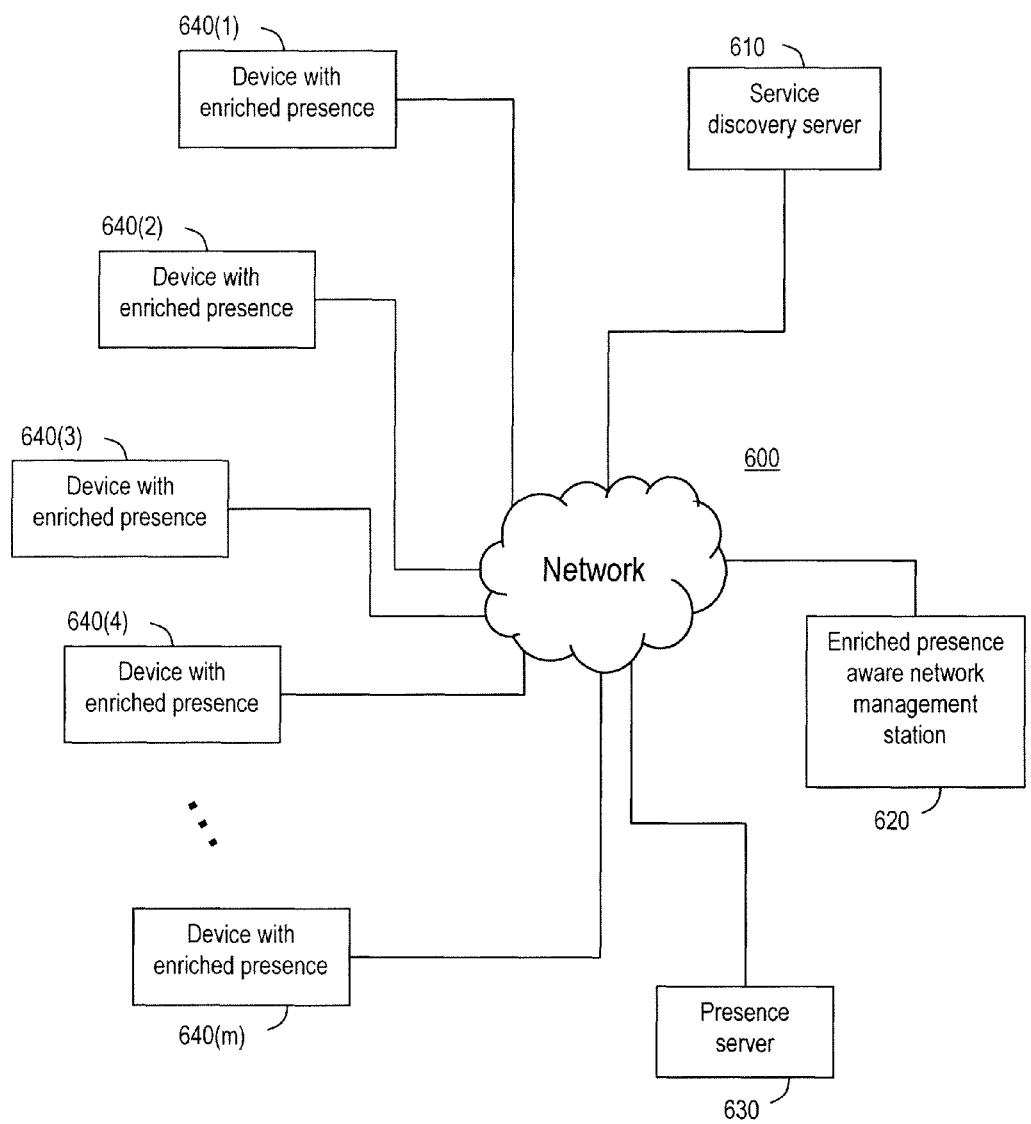
FIG. 6 is a block diagram of an example network in which one or more devices with enriched presence capability are managed by an enriched presence enabled NMS.

Referring now to FIG. 6, a block diagram shows an example network 600 in which one or more devices with enriched presence are managed by an enriched presence enabled NMS. The network 600 may be the same as network 100 and is described here in FIG. 6 in the context of an enriched presence leveraged from an existing messaging and presence protocol. Network 600 has a service discovery server 610, an enriched presence aware NMS 620, a presence server 630, and a plurality of devices with enriched presence 640(1)-640.

The service discovery server 610 is a server that provides a multicast service used by a host to advertise or publish the details of offered services, e.g., service instance name, service type, domain name, and configuration parameters. One example discovery service is multicast Domain Name Server (mDNS) which used for DNS based service discovery. Thus, service discovery server 610 may be in the form of a server that may reside anywhere in network 600. Other examples of service discovery mechanisms include Simple Service Discovery Protocol or Service Location Protocol. In this example, enriched presence aware NMS 620 registers with service discovery server 610 to advertise the service instance name and associated information for presence-driven network management services. The devices with enriched presence 640(1)-640 may then query the service discovery server 610 to "discover" their NMS, e.g., enriched presence aware NMS 620. The devices with enriched presence 640(1)-640 then establish an enriched presence with enriched presence aware NMS 620.

Once the enriched presence is established, the devices with enriched presence 640(1)-640 periodically send presence "heartbeats" or status messages to the enriched presence aware NMS 620. The heartbeats contain a set of parameters or other information about the individual devices. Example parameters include device name, configuration, inventory, IP address, location, software version, and the like, as described above. Enriched presence aware NMS 620 uses the information in the heartbeat to generate a network map and to provide presence-driven network management services using the presence capabilities of a messaging and presence protocol. Additional details of presence-driven network management services will generally be described in connection with FIGS. 7-9, and in greater detail in connection with FIG. 10.

Figure 7:
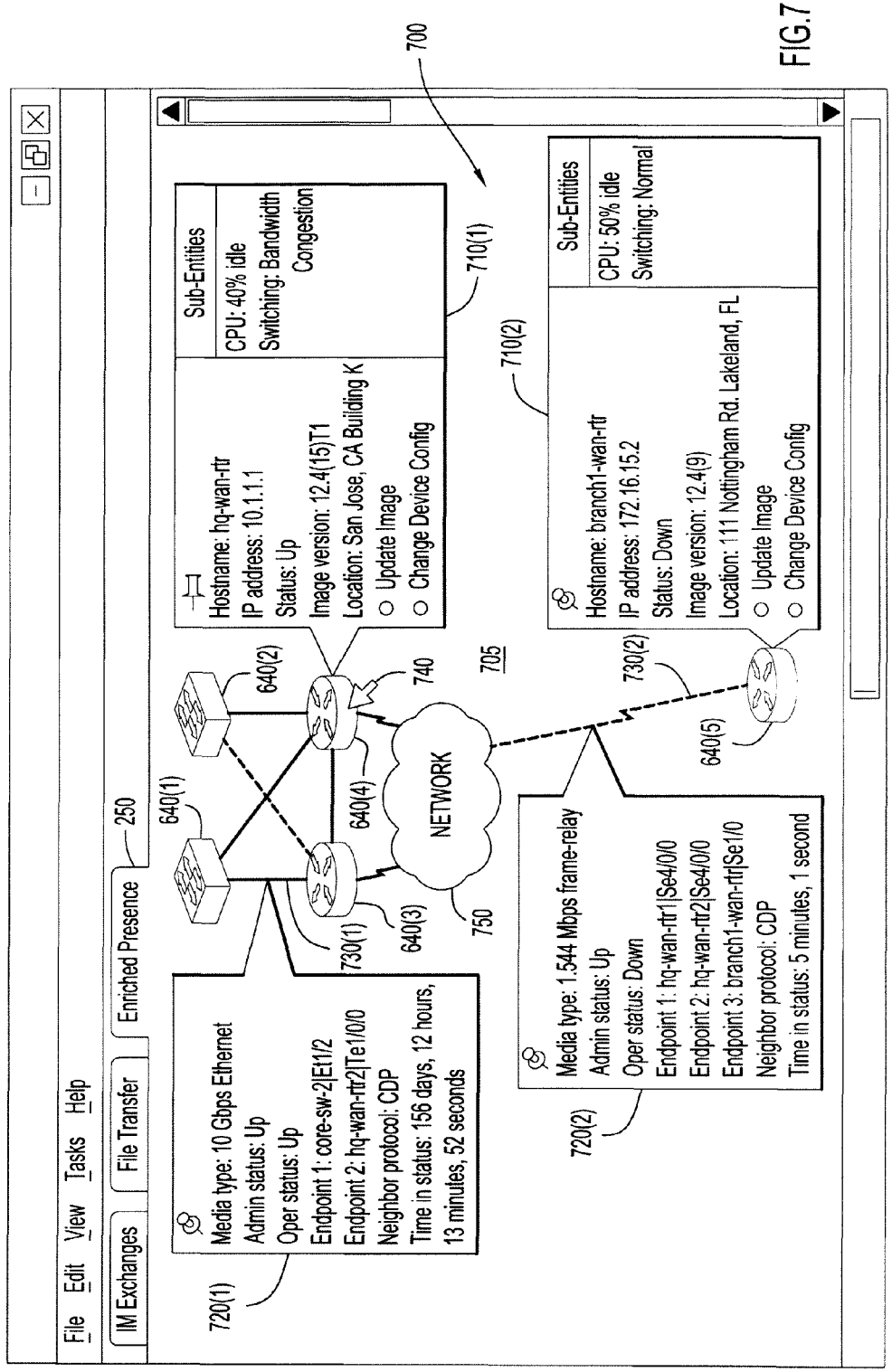
FIG. 7 is an example user interface screen for an enriched presence enabled NMS.

Turning to FIG. 7, the example GUI from FIG. 2 is shown with the "Enriched Presence" tab 250 selected. Within the display area 700 is a topographical map 705 of the network 600 from FIG. 6. The map shows devices with enriched presence 640(1)-640(5) and their associated connections, and a series of pop-up windows 710(1), 710(2), 720(1), and 720(2). In this example map, the service discovery server 610, enriched presence aware NMS 620, and presence server 630 are omitted for ease of illustration.

Devices with enriched presence 640(1) and 640(2) are switches as indicated by their associated icons, while devices with enriched presence 640(3), 640(4), and 640(5) are routers as indicated by router icons. The various connection types are illustrated by solid or dashed lines. Pop-up windows 710(1) and 710(2) are associated with devices with enriched presence 640(4) and 640(5), respectively, and pop-up windows 720(1) and 720(2) are associated with connections 730(1) and 730(2), respectively. Included within device pop-ups 710(1) and 710(2) are buttons configured to activate a management function, e.g., to update a software image or initiate a configuration change as shown. These management functions are examples only and other functions may be added as needed. The pop-up windows also show sub-entities or sub-buddies, as described above. These sub-entities may also be managed by "clicking" on one of the buttons.

In one example, a cursor 740 is used to mouse over the various devices and connections. By pausing the cursor 740 over a device or connection, a pop-up window will appear. Removing the cursor from the device or connection will cause the pop-up window to disappear, unless the pushpin is selected. The cursor 740 is currently positioned over device with enriched presence 640(4). The associated pop-up window 710(1) is not pinned as indicated by the horizontal pushpin, while pop-up windows 710(2), 720(1), and 720(2) are pinned to the display as indicated by the vertical pushpin.

Each pop-up window displays information received through presence heartbeats according to the associated object. For example, pop-ups 710(1) and 710(2) display router information including hostname, IP address, status, image or software version, and location or address. Pop-ups 720(1) and 720(2) display connection information such as media type, status, etc. Pop-up 720(1) indicates that the media type is 10 Gigabit Ethernet. This is shown on the map as a solid line between devices with enriched presence 640(1) and 640(3). Pop-up 720(2) indicates that the media type is frame-relay. This is shown on the map as a dashed line between the network cloud 750 and device with enriched presence 640(5). The map may be further enhanced through the use of various colors, line types, icons, etc. Thus, the map may be generated based the locations and attributes of the various objects in the network based in the information received through the presence heartbeats.

Figure 8:
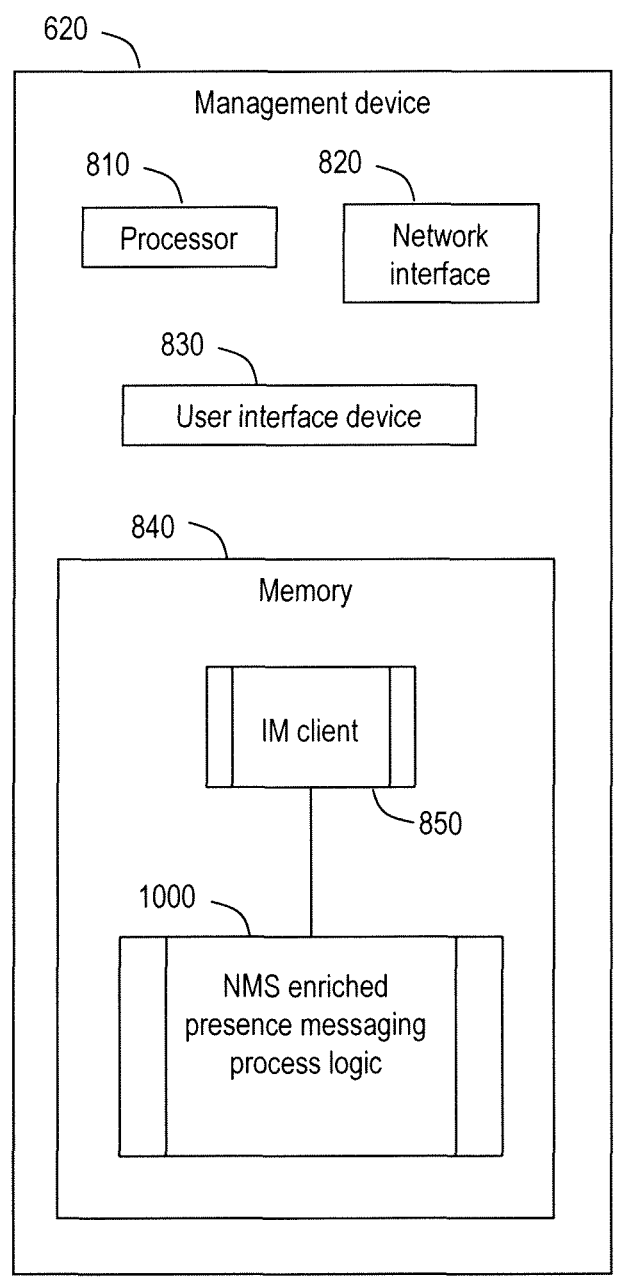
FIG. 8 an example block diagram of an enriched presence enabled NMS.

Referring to FIG. 8, an example block diagram of an enriched presence aware NMS, e.g., enriched presence aware NMS 620, is shown. The NMS 620 comprises a data processing device 810, a network interface unit 820, a user interface device 830, and a memory 840. Resident in the memory 840 is an IM client 850 and software configured to execute NMS enriched presence messaging process logic 1000. Briefly, process logic 1000 configures NMS 620 to monitor and manage devices on network 600 via a presence capability of a messaging and presence protocol associated with IM client 850, as generally described above. The details of the process logic 1000 will be described in connection with FIG. 10. The functions of the various components for enriched presence aware NMS 620 operate in substantially the same way as the components of NMS 130 as described in connection with FIG. 3.

Figure 9:
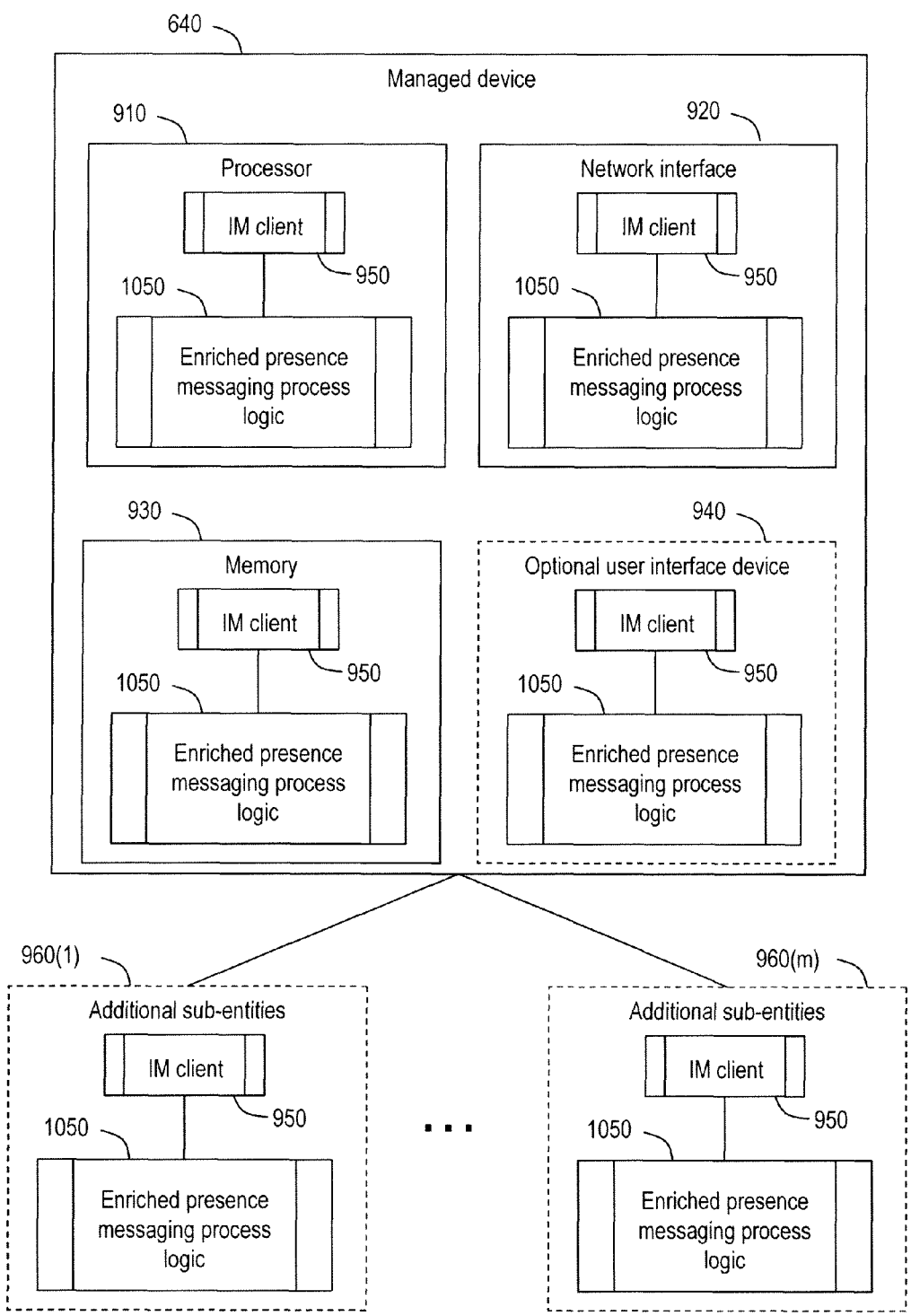
FIG. 9 is an example block diagram of an enriched presence enabled device with in which one or more sub-entities have enriched presence capability, and where the sub-entities may be embedded in or attached to the device.

Referring the FIG. 9, an example block diagram of a managed device, e.g., a device with enriched presence generally depicted at reference numeral 640, is shown. The block diagram of FIG. 9 is representative of the make-up of any or all of the devices 640(1)-640 shown in FIG. 6. The device with enriched presence 640 comprises entities with enriched presence including a data processing device 910, a network interface unit 920, an optional user interface device 930, and a memory 940. Resident in the memory 940 is an IM client 950 and software configured to execute enriched presence messaging process logic 1050. Briefly, process logic 1050 configures device with enriched presence 640 to generate presence heartbeats, and respond to any presence messages received from enriched presence aware NMS 620, as generally described above. The details of the process logic 1050 will be described in connection with FIG. 10.

Coupled to the device with enriched presence 640 are a plurality of additional sub-entities 960(1)-960. The additional sub-entities may be line cards in a chassis, peripherals, additional interfaces, or any other entity with presence capability. In this example, each entity is equipped with an IM client 950 and enriched presence messaging process logic 1050, thereby enabling each entity to report its own status to enriched presence aware NMS 620. For example, the memory 930 may report memory utilization and sub-entity 960(1) may be an optical interface for a router that reports wavelength utilization or bit error rates. In another example, each entity need not have its own IM client 950 and an IM client 950 residing on any entity, e.g., processor 910, may act as a proxy for any other entity or sub-entity.

Figure 10:
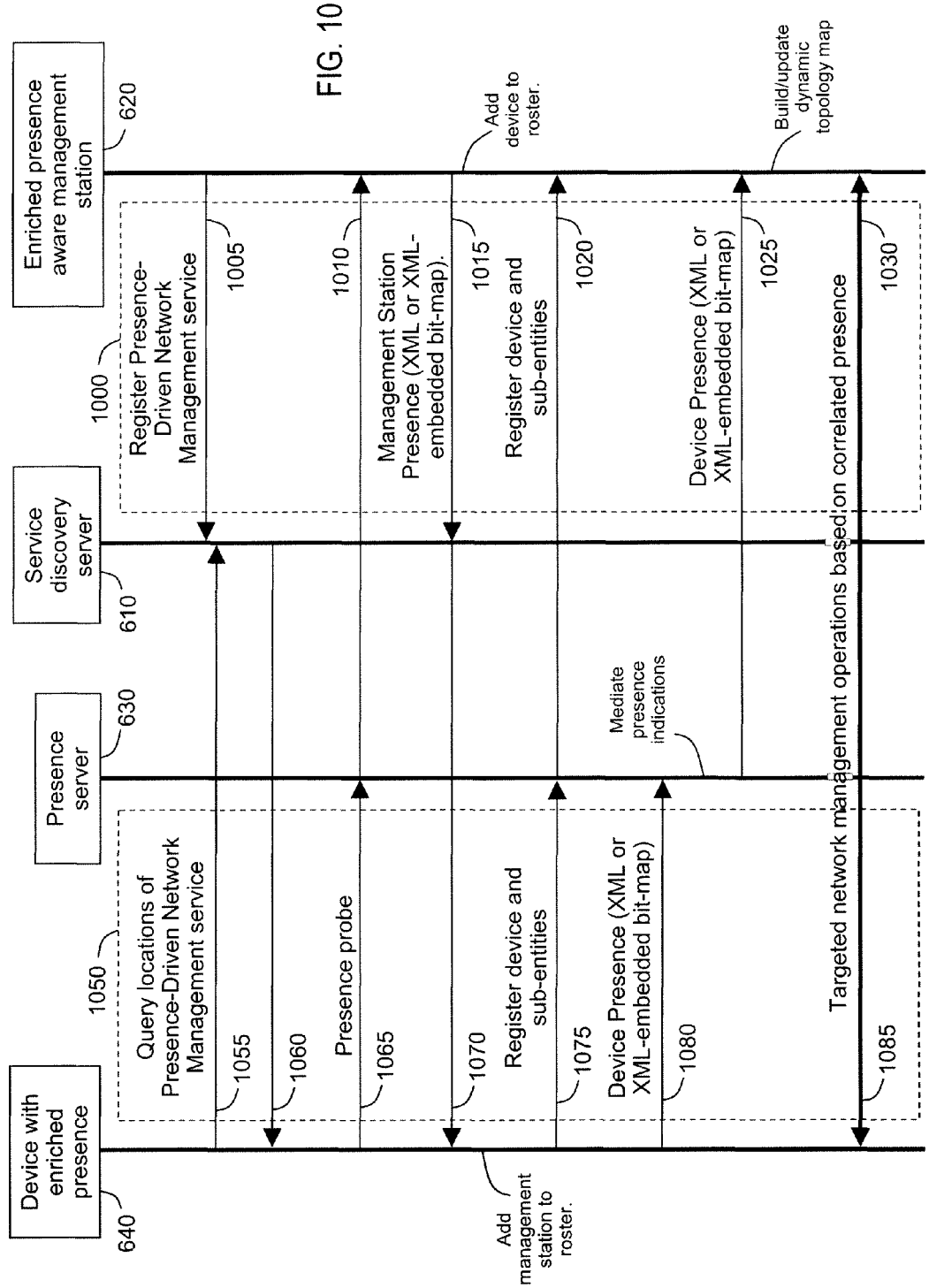
FIG. 10 is an example of a ladder diagram for a method to manage one or more enriched presence enabled devices.

Turning now to FIG. 10, the NMS enriched presence messaging process logic 1000 and the enriched presence messaging process logic 1050 will now be described. In FIG. 10, devices from FIG. 6, e.g., the service discovery server 610, the enriched presence aware NMS 620, the presence server 630, and a device with enriched presence 640 are shown in a ladder diagram. The steps associated with NMS enriched presence messaging process logic 1000 are framed with a dashed line and comprise steps 1005-1030, while steps associated with the enriched presence messaging process logic 1050 are also framed with a dashed line and comprise steps 1055-1085.

Starting with NMS enriched presence messaging process logic 1000, at 1005, enriched presence aware NMS 620 registers with the service discovery server 610. Referring to the enriched presence messaging process logic 1050, at 1055, the device with enriched presence 640 queries the service discovery server 610 for the locations NMSs with enriched presence-driven network management services. In this example, at 1060, the device with enriched presence 640 receives a response from the service discovery server 610 indicating that enriched presence aware NMS 620 can provide the necessary enriched presence-driven network management services.

At 1065, device with enriched presence 640 sends a presence probe message to enriched presence aware NMS 620 via the presence server 630 to determine the state of presence of enriched presence aware NMS 620. The presence probe also informs enriched presence aware NMS 620 that a device to be managed, i.e., device with enriched presence 640 has presence on the network. At 1015, enriched presence aware NMS 620 sends a presence message to device with enriched presence 640. In this example, an XML message or an XML message with an embedded bit-mapped message is sent using, e.g., XMPP.

Listing 1 shows an example presence message in XML format that is sent from the enriched presence aware NMS 620.

```
<?xml version="1.0" encoding="UTF-8"?>
<richPresenceMsg type="1" sequence="1">
```

-continued

```
<operationalState>inserviceActive</operationalState>
<utilization>48%</utilization>
<LastReload>1260986919</LastReload>
<minorFault active="true">
    <Message>Backplane utilization threshold
    exceeded</Message>
    <activeSince>1260987000</activeSince>
</minorFault>
<majorFault active="false"/>
<configlastChanged>1260986981</configLastChanged>
<inventoryLastChange>1260986975</inventoryLastChanged>
<requestCapabilitiesAndFeatures/>
<Capabilities>
        <IsRouter/>
        <IsVoiceGateway/>
</Capabilities>
<Features>
        <SupportsSNMP/>
        <SupportsSSH/>
        <SupportsNETCONF/>
        <SupportsXMPP/>
</Features>
</richPresenceMsg>
```

Listing 1. Sample XML Message Sent from an Enriched Presence Aware NMS.

Listing 2 shows an example presence message in bit-mapped format that is sent from the enriched presence aware NMS 620.

16-bit operational status presence Protocol Data Unit:

```
0               1
0 1 2 3 4 5 6 7 8 9 0 1 2 3 4 5
+-+-+-+-+-+-+-+-+-+-+-+-+-+-+-+-+
|            Status             |
+-+-+-+-+-+-+-+-+-+-+-+-+-+-+-+-+
```

The 24-bit status field applies to the management station.
The values of the status field bit-mask are as follows:
Bits 0, 1 and 2: Operational state: In-service, active (000), In-service, standby (001), Out of service, boot/initialization in progress (010), Out of service, boot/initialization complete (011), Out of service, administrative shutdown (100), Out of service, graceful shutdown in progress (101), Out of service, failed (110).
Bit 3: Booted since last heartbeat
Bits 4 and 5: Utilization: Free (00), light work (01), busy (10), overloaded (11).
Bit 6: Minor fault
Bit 7: Major fault
Bit 8: Performance degradation
Bit 9: Software version change
Bit 10: Request refresh of capabilities/features
Bit 11: Request refresh of virtual overlay associations
Bits 12-15: Other uses, TBD Listing 2. SAMPLE Bit-Mapped Message Sent from an Enriched Presence Aware NMS.

At 1070, device with enriched presence 640 receives the XML message. At 1075, the device with enriched presence 640 registers itself, its entities, and any sub-entities, e.g., network interface 920 and additional sub-entities 906(1)-960. At this point presence is established between the device with enriched presence 640 and the enriched presence aware NMS 620.

Listing 3 shows an example XML presence registration message that is sent from the device with enriched presence 640.

```
<?xml version="1.0" encoding="UTF-8"?>
<richPresenceMsg type="2" sequence="2">
    <Identity>
        <JabberID>core-router@example.com</JabberID>
        <Hostname>core-router.example.com</Hostname>
        <binaryHandle>000000000000000</binaryHandle>
        <ManagementIP>10.1.1.1</ManagementIP>
        <SystemDescription>Cisco IOS Software, c7600s72033__rp
        Software (c7600s72033__rp-ADVIPSERVICESK9-M), Version
12.2(33)SRC1, RELEASE SOFTWARE (fc1)</SystemDescription>
    </Identity>
    <Capabilities>
        <IsRouter/>
        <IsVoiceGateway/>
    </Capabilities>
    <Features>
        <SupportsSNMP/>
    </Features>
    <Neighbor id="edge-router@example.com">
        <binaryHandle>100000000000000</binaryHandle>
        <ManagementIP>10.1.1.2</ManagementIP>
        <LocalIntf>
                <Name>GigabitEthernet1/0/0</Name>
                <IfIndex>1</IfIndex>
                <binaryHandle>000000001000001</binaryHandle>
                <Status>up</Status>
                <Speed>1000000000</Speed>
                <Duplex>full</Duplex>
        </LocalIntf>
        <RemoteIntf>
                <Name>GigabitEthernet5/1</Name>
                <IfIndex>1</IfIndex>
                <binaryHandle>100001000000000</binaryHandle>
                <Status>up</Status>
                <Speed>1000000000</Speed>
                <Duplex>full</Duplex>
        </RemoteIntf>
    </Neighbor>
</richPresenceMsg>
```

Listing 3. Sample XML Registration Message Sent from a Device with Enriched Presence.

At 1080, the device with enriched presence 640 and any presence configured entities or sub-entities send periodic presence updates or heartbeats to the enriched presence aware NMS 620. In this example, an XML message or an XML message with an embedded bit-mapped message is sent using, e.g., XMPP. The heartbeats contain a set of parameters or other information about the individual devices. Example parameters include device name, IP address, location, software version, etc.

Listing 4 shows an example bit-mapped presence message that is sent from the device with enriched presence 640.

```
32-bit operational status presence PDU:

0                   1                   0                   1
 0 1 2 3 4 5 6 7 8 9 0 1 2 3 4 5 0 1 2 3 4 5 6 7 8 9 0 1 2 3 4 5
+-+-+-+-+-+-+-+-+-+-+-+-+-+-+-+-+-+-+-+-+-+-+-+-+-+-+-+-+-+-+-+-
|     Sub-entity    |M|           Status                        |
+-+-+-+-+-+-+-+-+-+-+-+-+-+-+-+-+-+-+-+-+-+-+-+-+-+-+-+-+-+-+-+-
```

The 16-bit status field applies to the sub-entity. A sub-entity field of all-zeros identifies the 'device proper'. Other sub-entities may be sub-components, resources, interfaces and neighbors.
A value of 1 in the 'M' or 'more' field indicates that there are additional presence vectors that are stacked after this PDU.
The values of the 16-bit status field bit-mask for the device proper and its sub-components, resources, interfaces and neighbors are as follows (definitions adapted to the semantics of the particular sub-entity):
Bits 0, 1 and 2: Operational state: In-service, active (000), In-service, standby (001), Out of service, boot/initialization in progress (010), Out of service, boot/initialization complete (011), Out of service, administrative shutdown (100), Out of service, graceful shutdown in progress (101), Out of service, failed (110).
Bit 3: Booted since last heartbeat Bits 4 and 5: Utilization: Free (00), light work (01), busy (10), overloaded (11).
Bit 6: Minor fault
Bit 7: Major fault
Bit 8: Performance degradation
Bit 9: Configuration change
Bit 10: Inventory change (including software changes such as version upgrades)
Bit 11: Change in capabilities/features
Bit 12: Change in virtual overlay association
Bit 13: Any reload will use a different code image
Bits 14-15: Other uses, TBD The values of the status field bit-mask for neighbors are:
Bit 0: Reachable/Not reachable
Bit 1: Reachable intermittently
Bit 2: Degraded/lossy communications
Bit 3 Round trip response time above threshold
Bit 4: Jitter above threshold
Bit 5: Remote fault indication from neighbor that is specific to the neighbor
Bit 6: Remote fault indication from neighbor that is points to an upstream fault
Bit 7-15: Other uses, TBD Listing 4. Sample Bit-Mapped Presence Message Sent from a Device with Enriched Presence.

Listing 5 shows an example XML presence message that is sent from a device with enriched presence that also has an associated Optical Carrier (OC)-3 interface.

```xml
<?xml version="1.0" encoding="UTF-8"?>
<richPresenceMsg type="3" sequence="1">
    <subEntity>
        <subEntityType>main device</subEntityType>
            <binaryHandle>000000000000000</binaryHandle>
        <operationalState>inserviceActive</operationalState>
        <utilization>48%</utilization>
        <LastReload>1260986919</LastReload>
        <minorFault active="true">
            <Message>Backplane utilization threshold exceeded</Message>
            <activeSince>1260987000</activeSince>
        </minorFault>
        <majorFault active="false"/>
        <configLastChanged>1260986981</configLastChanged>
        <inventoryLastChange>1260986975</inventoryLastChanged>
        <Capabilities>
            <IsRouter/>
            <IsVoiceGateway/>
        </Capabilities>
        <Features>
            <SupportsSNMP/>
            <SupportsSSH/>
            <SupportsNETCONF/>
            <SupportsXMPP/>
        </Features>
    </subEntity>
    <subEntity>
        <subEntityType>OC3 interface</subEntityType>
        <binaryHandle>000000000001011</binaryHandle>
        <operationalState>inserviceActive</operationalState>
        <utilization>20%</utilization>
        <minorFault active="false"/>
        <majorFault active="false"/>
        <configLastChanged>1260945863</configLastChanged>
        <inventoryLastChange>1260722251</inventoryLastChanged>
    </subEntity>
</richPresenceMsg>
```

Listing 5. Sample XML Enriched Presence Message Sent from a Device with Enriched Presence that has an OC-3 Interface.

Referring again to FIG. 10, at 1030, from the set of parameters in the enriched presence message sent from the device with enriched presence 640, the enriched presence aware NMS 620 can perform target management functions on any entities or sub-entities associated with the device with enriched presence 640, and generates the network topology map as described above. In one example, the application hosting the GUI or managing the managed devices may set off an audible alarm or visual indication when operational parameter associated with the managed devices change.

In summary, the techniques described herein provide for establishing at a network management server a presence on a network. A presence associated with one or more managed devices on the network is detected. An instant messaging (IM) session is established with the one or more managed devices. The IM session forms a virtual chat room for performing a management function on the one or more managed devices, and IM messages are sent that are configured to perform the management function on the one or more managed devices.

In another example, establishing the presence comprises registering with an IM mediation server on the network. The IM mediation server mediates presence on the network, and advertises to the one or more managed devices the session establishment capabilities of the network management server.

In one example, a user interface screen is provided. A contact list associated with the virtual chat room comprising the one or more managed devices and a first user operating the network management server is displayed in a first display area of the user interface screen. The contact list indicates one or more of contact name, presence status, and device type. A messaging area is displayed in a second display area of the user interface screen that is configured for displaying incoming IM messages and for enabling the first user to configure an outgoing IM message for performing the management function, and for displaying other parameters or events associated with the virtual chat room. Operational parameters associated with the one or more managed devices contained in the incoming IM messages are also displayed. A second user may join the virtual chat room, and the first and second users may perform the management function collaboratively.

In another example, the first user is enable to configure an outgoing IM message to perform the management function such that the first user may modify the operational parameters associated with the one or more managed devices, and perform a file transfer function among the one or more managed devices and between the one or more managed devices and the network management server. The management function may be performed on individual ones of the one or more managed devices, or substantially simultaneously on groups of the one or more managed devices.

Techniques are also provided herein for establishing on a network an enriched presence by a network management server that is configured to perform a management function via a presence function of a messaging and presence protocol. An enriched presence associated with a managed device is detected on the network. In response to detecting the enriched presence associated with the managed device, an enriched presence message is sent to the managed device that is configured to allow the managed device to establish presence with the network management server. A registration message is received from the managed device that is configured to register the device and any sub-entities associated with the managed device. The managed device or endpoint is managed based on a correlated presence between the network management server and the managed device.

In one example, the network management server or device establishes enriched presence by registering an enriched presence driven network management service with a discovery service such that the managed device is able to discover the network management server. The managed device and the network management server maintain a mutually correlated presence by exchanging periodic enriched presence messages between the managed device and the network management server. The enriched presence messages sent by the managed device comprise one or more operational parameters associated with the managed device. Determining which management function to perform may be based on the one or more operational parameters contained in the enriched presence messages. A network topology map may be generated for the network comprising at least one of the one or more managed devices and the communications pathways between the one or more managed devices based on the enriched presence messages, or the one or more operational parameters contained therein.

In another example, the network topology map is displayed on a user interface screen configured to present the operational parameters to a user and present communications parameters associated with the communications pathways to the user. An alarm may be generated in response to a change in the one or more operational parameters sent by the managed device. The alarm may be a visual indication shown on the network topology map.

In another example, the user interface screen is configured to receive inputs from the user such that the user may modify the operational parameters, modify the communications parameters, and perform a file transfer function among the one or more managed devices and between the one or more managed devices and the network management server.

Techniques are also provided herein for managed devices. At a network device, a presence is established on a network. A presence associated with a management device is detected on the network. An invitation message to join an instant messaging (IM) session is received from the management device and an acceptance message is sent to the management device such that the IM session is established. The IM session forms a virtual chat room for performing a management function on the network device. An IM message comprising a management function command is received from the management device. An IM message comprising a response to the management function command is sent to the management device.

In another example, an enriched presence is established by a managed device, enriched presence being configured to perform a management function via a presence function of a messaging and presence protocol. An enriched presence is detected that is associated with a network management server on the network. In response to detecting the enriched presence associated with the network management server, an enriched presence message is sent to the network management server configured to allow the network management server to establish presence with the managed device, and an enriched presence message is received from the network management server configured to change the operation of the managed device. The managed device may query a service discovery server to discover the network management server associated with an enriched presence driven network management service and then send an enriched presence message to the network management server.

The above description is intended by way of example only.

What is claimed is:

1. A method comprising:
   at a network management server, establishing a presence on a network;
   detecting a presence associated with one or more managed devices on the network;
   establishing an instant messaging (IM) session with the one or more managed devices, wherein the IM session forms a virtual chat room;
   maintaining, through the virtual chat room, a management bus between the network management server and the one or more managed devices for performing a management function on the one or more managed devices by sending IM messages according to an IM protocol; and
   sending IM messages through the IM session configured to perform the management function on the one or more managed devices.

2. The method of claim 1, wherein establishing the presence comprises registering with an IM mediation server on the network, wherein the IM mediation server mediates presence on the network, and further comprising advertising by the IM mediation server to the one or more managed devices the session establishment capabilities of the network management server.

3. The method of claim 1, further comprising:
   displaying in a first display area of a user interface screen, a contact list associated with the virtual chat room comprising the one or more managed devices and a first user operating the network management server, wherein the contact list indicates one or more of contact name, presence status, and device type; and
   displaying in a second display area of the user interface screen, a messaging area configured for displaying incoming IM messages and for enabling the first user to configure an outgoing IM message for performing the management function, and for displaying other parameters or events associated with the virtual chat room.

4. The method of claim 3, further comprising generating data for displaying a joining of a second user to the virtual chat room.

5. The method of claim 3, wherein displaying incoming IM messages comprises displaying operational parameters associated with the one or more managed devices.

6. The method of claim 5, and further comprising receiving an input from the first user to configure an outgoing IM message to perform the management function such that the first user may modify the operational parameters associated with the one or more managed devices, and perform a file transfer function among the one or more managed devices and between the one or more managed devices and the network management server, and so that the management function may be performed on individual ones of the one or more managed devices, or substantially simultaneously on groups of the one or more managed devices.

7. The method of claim 1, wherein detecting the presence associated with the one or more managed devices comprises receiving an enriched presence message from each of the one or more managed devices comprising one or more operational parameters associated with a corresponding managed device.

8. The method of claim 7, further comprising determining which management function to perform based on the one or more operational parameters contained in the enriched presence messages.

9. The method of claim 7, further comprising generating data representing a network topology map for the network comprising at least one of the one or more managed devices and the communications pathways between the one or more managed devices based on the enriched presence messages.

10. The method of claim 9, wherein performing comprises performing the management function on the one or more managed devices outside the virtual chat room in response to determining which management function to perform.

11. The method of claim 9, further comprising displaying the network topology map on a third display area configured to present the operational parameters to the first user and present communications parameters associated with the communications pathways to the first user, wherein the third display area is part of the user interface screen or part of a separate user interface screen.

12. The method of claim 11, and further comprising receiving inputs from the first user to modify the operational parameters, modify the communications parameters, and perform a file transfer function among the one or more managed devices and between the one or more managed devices and the network management server.

13. The method of claim 1, wherein sending IM messages configured to perform the management function comprises sending IM messages configured to modify at least one of a device name, a configuration, an IP address, a location, and a software version parameter of the managed device.

14. A method comprising:
at a network device, establishing a presence on a network;
detecting a presence associated with a management device on the network;
receiving an invitation message to join an IM session from the management device;
sending an acceptance message to the management device such that the IM session is established, wherein the IM session forms a virtual chat room;
maintaining, through the virtual chat room, a management bus between the management device and the network device for performing a management function on the network device by receiving IM messages according to an IM protocol; and
receiving an IM message through the IM session comprising a management function command from the management device.

15. The method of claim 14, further comprising sending to the management device an IM message comprising a response to the management function command.

16. The method of claim 14, wherein receiving the IM message comprises receiving an IM message configured to modify at least one of a device name, a configuration, an IP address, a location, and a software version parameter.

17. An apparatus comprising:
a network interface configured to enable communications over a network;
a processor configure to:
establish a presence on the network;
detect a presence associated with one or more managed devices on the network;
establish an instant messaging (IM) session with the one or more managed devices, wherein the IM session forms a virtual chat room;
maintain, through the virtual chat room, a management bus with the one or more managed devices for performing a management function on the one or more managed devices by sending IM messages according to an IM protocol; and
send IM messages through the IM session configured to perform the management function on the one or more managed devices.

18. The apparatus of claim 17, wherein the processor is configured to establish the presence by registering with an IM mediation server on the network.

19. The apparatus of claim 17, wherein the processor is further configured to:
generate data to display in a first display area of a user interface screen, a contact list associated with the virtual chat room comprising the one or more managed devices and a first user operating the network management server, wherein the contact list indicates one or more of contact name, presence status, and device type; and
generate data to display in a second display area of the user interface screen, a messaging area configured for displaying incoming IM messages and for enabling the first user to configure an outgoing IM message for performing the management function, and for displaying other parameters or events associated with the virtual chat room.

20. The apparatus of claim 19, wherein the processor is further configured to generate data to display a joining of a second user to the virtual chat room.

21. The apparatus of claim 19, wherein the processor is configured to generate data to display incoming IM messages comprising operational parameters associated with the one or more managed devices.

22. The apparatus of claim 21, wherein the processor is configured to receive inputs from the first user to configure an outgoing IM message to perform the management function to modify the operational parameters associated with the one or more managed devices, and perform a file transfer function among the one or more managed devices and between the one or more managed devices and the network management server, and so that the management function may be performed on individual ones of the one or more managed devices, or substantially simultaneously on groups of the one or more managed devices.

23. The apparatus of claim 17, wherein the processor is configured to send IM messages configured to modify at least one of a device name, a configuration, an IP address, a location, and a software version parameter of the one or more managed devices.

24. A processor readable medium storing instructions that, when executed by a processor, cause the processor to:
establish a presence on a network;
detect a presence associated with one or more managed devices on the network;
establish an instant messaging (IM) session with the one or more managed devices, wherein the IM session forms a virtual chat room;
maintain, through the virtual chat room, a management bus with the one or more managed devices for performing a management function on the one or more managed devices by sending IM messages according to an IM protocol; and
send IM messages through the IM session configured to perform the management function on the one or more managed devices.

25. The processor readable medium of claim 24, wherein the instructions that cause the processor to establish comprise instructions that cause the processor to establish the presence by registering with an IM mediation server on the network.

26. The processor readable medium of claim 24, further comprising instructions that, when executed by the processor, cause the processor to:
generate data to display in a first display area of a user interface screen, a contact list associated with the virtual chat room comprising the one or more managed devices and a first user operating the network management server, wherein the contact list indicates one or more of contact name, presence status, and device type; and generate data to display in a second display area of the user interface screen, a messaging area configured for displaying incoming IM messages and for enabling the first user to configure an outgoing IM message for performing the management function, and for displaying other parameters or events associated with the virtual chat room.

27. The processor readable medium of claim 26, wherein the instructions that cause the processor to generate data to display incoming IM messages comprise instructions that cause the processor to generate data to display operational parameters associated with the one or more managed devices.

28. The processor readable medium of claim 27, and further comprising instructions that cause the processor to receive inputs from the first user to configure an outgoing IM message to perform the management function to modify the operational parameters associated with the one or more managed devices, and perform a file transfer function among the one or more managed devices and between the one or more managed devices and the network management server, and so that the management function may be performed on individual ones of the one or more managed devices, or substantially simultaneously on groups of the one or more managed devices.

29. The processor readable medium of claim 24, wherein the instructions that cause the processor to send IM messages configured to perform the management function on the one or more managed devices comprise instructions that cause the processor to send IM messages configured to modify at least one of a device name, a configuration, an IP address, a location, and a software version parameter of the one or more managed devices.

* * * * *